No. 759,682. PATENTED MAY 10, 1904.
P. C. DOCKSTADER.
TRANSPORTATION TICKET.
APPLICATION FILED APR. 18, 1903.
NO MODEL. 3 SHEETS—SHEET 1.

INVENTOR
Preston C. Dockstader

No. 759,682.  
PATENTED MAY 10, 1904.

P. C. DOCKSTADER.  
TRANSPORTATION TICKET.  
APPLICATION FILED APR. 18, 1903.

NO MODEL.  
3 SHEETS—SHEET 2.

Fig. 3

Fig. 4

WITNESSES:

INVENTOR  
Preston C. Dockstader  
BY  
his Attorneys

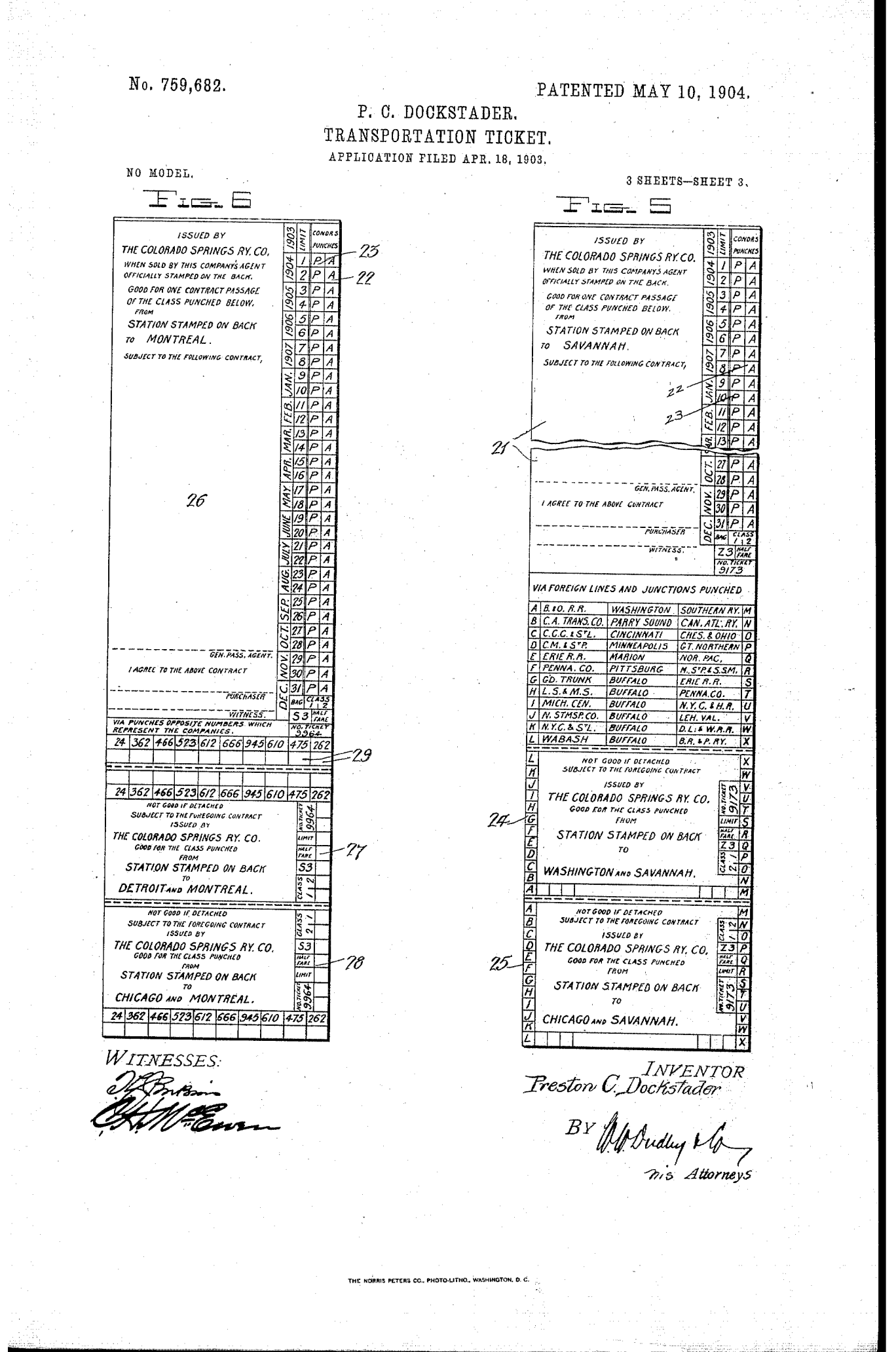

No. 759,682. PATENTED MAY 10, 1904.
P. C. DOCKSTADER.
TRANSPORTATION TICKET.
APPLICATION FILED APR. 18, 1903.

NO MODEL. 3 SHEETS—SHEET 3.

Fig. 6

Fig. 5

INVENTOR
Preston C. Dockstader

BY
his Attorneys

WITNESSES:

No. 759,682. Patented May 10, 1904.

UNITED STATES PATENT OFFICE.

PRESTON C. DOCKSTADER, OF COLORADO SPRINGS, COLORADO.

TRANSPORTATION-TICKET.

SPECIFICATION forming part of Letters Patent No. 759,682, dated May 10, 1904.

Application filed April 18, 1903. Serial No. 153,169. (No model.)

*To all whom it may concern:*

Be it known that I, PRESTON C. DOCKSTADER, a citizen of the United States, residing at Colorado Springs, in the county of El Paso and State of Colorado, have invented certain new and useful Improvements in Transportation-Tickets; and I do hereby declare the following to be a full, clear, and exact description of the invention, such as will enable others skilled in the art to which it appertains to make and use the same.

This invention relates to transportation-tickets, and is an improvement upon the construction of tickets forming the subject-matter of my applications for patents filed January 5, 1903, and March 11, 1903, and numbered serially 137,810 and 147,320.

The nature of the present improvements will be readily understood, reference being had to the following detailed description and to the accompanying drawings, in which—

Figure 1 is a view in two sections of a transportation-ticket embodying my present improvements. Fig. 2 is a side elevation, centrally broken away, of the same, showing the detachable sections partly folded. Fig. 3 is a view similar to Fig. 1 of a ticket containing modifications. Fig. 4 is a view similar to Fig. 2 of the ticket shown in Fig. 3. Fig. 5 is a view of a portion of a ticket, partly broken away, containing further modifications. Fig. 6 is a view of a portion of a ticket containing still further modifications.

Referring to the drawings by numerals, and first to the construction shown in Figs. 1 and 2, 1 designates the main portion or body of the ticket, to the upper end of which is connected by a weakened line three sections 2 3 4, each detachable at the weakened lines shown. The main portion or body of the ticket has printed thereon the name of the issuing-line and the destination, if the latter is an active point. If inactive, a designated line is provided for the insertion, by writing or otherwise, of the destination. Below is the contract, and at one side of the upper portion of the main portion or body is a month and year column and a plurality of columns each consecutively numbered to represent the days of a month. Of the four consecutively-numbered columns shown the innermost column, 5, is punched by the agent to limit the ticket, it being understood that the month and year is likewise punched, and the other columns 6, 7, and 8 are punched by the conductors when examining the ticket. If, for instance, the issuing date stamped on the back is January 7, 1903, and the ticket is presented to three conductors in that day's run, the punched spaces will show the day the ticket was used and the punch-marks will inform the auditor's office by what conductors the ticket was examined; or if the run consumes a number of days the history of the run will be clearly exhibited, as the conductors will be required to punch the number corresponding to the day of the month and to employ the columns successively.

The sections 2, 3, and 4 are the omnibus-transfer section, auditor's section or stub, and agent's section or stub, and to the lower end of the main portion or body are connected by a weakened line ticket-sections 9 and 10 for transportation companies over whose lines the ticket is good for passage. The main portion or body and the sections 2, 3, 4, 9, and 10 each contain the number of the whole ticket, class, limit, and half-fare punch-spaces, so arranged in the sections 2, 3, and 4 and the sections 9 10 to permit of punching at a single operation by folding the sections, as shown in Fig. 2. Each portion of the ticket also contains a space 11, containing characters—in this instance "Y 3"—to show that there are three sections 1, 9, and 10 to the ticket.

The line and junction point of travel or route to be selected by the purchaser of the ticket are each known by a character—in this instance a letter of the alphabet. On the main portion or body of the ticket are nineteen routes, lettered from "A" to "S," inclusive, in a column 12, and the sections 2, 3, 4, 9, and 10 are provided with spaces containing similar letters alphabetically arranged. If the purchaser desires to go from a point on the Colorado Springs Railway Company to New York city via the Pennsylvania Railroad, he will select the Colorado Springs Railway Company's line to Chicago and the Pennsylvania Railroad Company's line from Chicago to New York city, and the agent will punch the spaces containing the letters "A" and "R" on the main portion and all of the sections of the ticket. It will be noted that the lettered spaces on the sections are arranged to be simultaneously punched by folding the sections as shown in Fig. 2. If the purchaser at the same starting-point desires to go to New York city via the Michigan Central and New York Central roads, then the letters "K" and "P" will be punched, and so on. If the destination is an active point, it is printed on the sections; otherwise a space is left for insertion by writing or otherwise. The sections 9 and 10 are preferably provided with spaces 13 13 for conductors' punches.

The ticket illustrated in Figs. 3 and 4 consists of a body 14, agent's stub, auditor's stub, and omnibus-transfer, respectively numbered 17, 16, and 15, and a single detachable ticket-section 18. The list of lines over which the ticket is good for passage, which list may include the issuing-line, is identified by characters, which may be letters alphabetically arranged, the lines and letters being divided and disposed in two columns on the body of the ticket, the columns 19 19, containing the letter characters, being at the sides of said body, and on the section 18 are columns 20 20 of letters arranged to receive the simultaneous punching of corresponding letters in two columns 19 and 20 by a single operation. It will be observed that the portion of the body of the ticket containing the lines and numbered 14' is of the same dimensions as the section 18. As the ticket has but a single detachable section 18, the characters "Y 2" will be employed to show that the ticket has but two transportation-sections.

Referring now to Fig. 5, in which is shown a portion of a ticket having two detachable transportation-sections, 21 designates the body, having two columns 22 23, respectively lettered "A" and "P," denoting the divisions of a day. In practice these lettered spaces are successively punched by the conductors examining the ticket, so that a complete record and check on the conductors is obtained. The ticket is otherwise similar to that illustrated in Fig. 3, with the difference that the body of the ticket contains letter-designated foreign lines and junctions on said lines, and for active points the ticket-sections 24 25 have each printed thereon the destination and the immediately preceding junction-point. The ticket is provided with two detachable transportation-sections foldable relatively to the portion of the body containing the foreign lines and junctions to effect the punching of each proper character by one operation.

In Fig. 6 is shown a ticket having a body 26 and transportation-sections 27 28 similar to the body and sections of the ticket illustrated in Fig. 3, with the difference that in lieu of the list of lines on the body of the ticket there are provided a plurality of punch-spaces 29 29, at which are numbers corresponding to the numbers of the lines. The practice of numbering railroad and steamship lines has obtained for some time and many lines are familiar with the practice, and this custom is made use of in the present ticket. For instance, the number 24 may denote the issuing-line, the next six numbers the intermediate lines, and the last three the destination-lines. Each detachable section is likewise provided with these numbers properly arranged to facilitate punching by folding the sections, the spaces 29 being provided to prevent obliteration of the numbers by the punch-perforations. The sections 27 28 are printed to include the destination and immediately-preceding junction-point, where the destination is active; otherwise the destination is written or otherwise inserted.

I claim as my invention—

1. A transportation-ticket having its main portion bearing matter rendering it good for passage and having a list of lines and junctions over which the ticket may be used, a character at each line, a transportation-section connected to the main portion and provided with characters corresponding with the characters on the main portion.

2. A ticket for transportation over lines of connecting companies, comprised of a plurality of connected sections bearing matter rendering them good for passage, the main section having a list of lines and junctions over which the ticket may be used, and a character at each line, and the other sections each provided with characters corresponding with the characters on the main section.

In testimony whereof I affix my signature in presence of two witnesses.

PRESTON C. DOCKSTADER.

Witnesses:
W. T. NORTON,
L. M. GOTWALD.